(12) United States Patent
Hirooka et al.

(10) Patent No.: US 10,618,197 B2
(45) Date of Patent: Apr. 14, 2020

(54) GYPSUM-BASED BOARD MATERIAL PRODUCING APPARATUS

(71) Applicant: YOSHINO GYPSUM CO., LTD., Tokyo (JP)

(72) Inventors: Yuichi Hirooka, Tokyo (JP); Seigo Ishibashi, Tokyo (JP); Masaru Yoshida, Tokyo (JP)

(73) Assignee: YOSHINO GYPSUM CO., LTD., Tokyo (JP)

(*) Notice: Subject to any disclaimer, the term of this patent is extended or adjusted under 35 U.S.C. 154(b) by 0 days.

(21) Appl. No.: 16/075,733

(22) PCT Filed: Feb. 6, 2017

(86) PCT No.: PCT/JP2017/004273
§ 371 (c)(1),
(2) Date: Aug. 6, 2018

(87) PCT Pub. No.: WO2017/138498
PCT Pub. Date: Aug. 17, 2017

(65) Prior Publication Data
US 2019/0054656 A1    Feb. 21, 2019

(30) Foreign Application Priority Data
Feb. 10, 2016   (JP) ................. 2016-023897

(51) Int. Cl.
*B01F 3/04* (2006.01)
*B01F 3/12* (2006.01)
*B28B 1/50* (2006.01)
*B32B 13/04* (2006.01)
*C04B 38/10* (2006.01)
(Continued)

(52) U.S. Cl.
CPC .................. *B28C 7/04* (2013.01); *B01F 3/04* (2013.01); *B01F 3/04446* (2013.01); *B01F 3/12* (2013.01);
(Continued)

(58) Field of Classification Search
CPC .......... B01F 3/04; B01F 3/04446; B01F 3/12; B01F 2003/1292; B01F 15/0283;
(Continued)

(56) References Cited

U.S. PATENT DOCUMENTS 4,455,271 A    6/1984   Johnson
4,498,318 A *  2/1985   Mitter ................ D06B 19/0094
                                                            118/694

(Continued)

FOREIGN PATENT DOCUMENTS

CN    101184703    5/2008
CN    104853892    8/2015
(Continued)

OTHER PUBLICATIONS

Extended European Search Report for 17750221.8 dated Apr. 5, 2019.
(Continued)

*Primary Examiner* — Michael A Tolin
(74) *Attorney, Agent, or Firm* — IPUSA, PLLC

(57) ABSTRACT

Provided is a gypsum-based board producing apparatus including: a mixer configured to prepare a gypsum slurry; a foaming apparatus; and a pump configured to convey foam generated by the foaming apparatus to the mixer, wherein the pump is a positive displacement pump.

6 Claims, 11 Drawing Sheets

(51) Int. Cl.
*B28C 7/04* (2006.01)
*B01F 7/26* (2006.01)
*B28B 17/00* (2006.01)
*B01F 15/02* (2006.01)
*B28B 19/00* (2006.01)
*B28C 5/38* (2006.01)
*C04B 111/00* (2006.01)
*E04C 2/04* (2006.01)

(52) U.S. Cl.
CPC ............ *B01F 7/26* (2013.01); *B01F 15/0283* (2013.01); *B28B 1/50* (2013.01); *B28B 17/0081* (2013.01); *B28B 19/0092* (2013.01); *B28C 5/386* (2013.01); *B32B 13/045* (2013.01); *B01F 2003/1292* (2013.01); *B01F 2215/0047* (2013.01); *C04B 38/106* (2013.01); *C04B 2111/0062* (2013.01); *E04C 2/049* (2013.01)

(58) Field of Classification Search
CPC ............... B01F 2215/0047; B28B 1/50; B28B 17/0081; B28B 19/0092; B28C 5/0881; B28C 5/1269; B28C 5/381; B28C 5/386; B32B 13/045; B32B 13/08; B32B 13/14; C04B 28/14; C04B 38/106; C04B 2111/00629; E04C 2/049
See application file for complete search history.

(56) References Cited

U.S. PATENT DOCUMENTS

| | | | | |
|---|---|---|---|---|
| 7,803,296 B2* | 9/2010 | Miller | .................... | B28B 5/027 106/677 |
| 8,535,583 B2* | 9/2013 | Symons | .............. | B01F 7/00908 264/1.29 |
| 2005/0121131 A1 | 6/2005 | Hennis et al. | | |
| 2006/0244182 A1 | 11/2006 | Wittbold et al. | | |
| 2007/0008815 A1 | 1/2007 | Nakamura et al. | | |
| 2007/0082170 A1* | 4/2007 | Colbert | ................... | B01F 5/221 428/70 |
| 2008/0202415 A1 | 8/2008 | Miller et al. | | |
| 2015/0315074 A1 | 11/2015 | Ueno et al. | | |
| 2017/0008192 A1 | 1/2017 | Kawamura et al. | | |

FOREIGN PATENT DOCUMENTS

| | | | | |
|---|---|---|---|---|
| EP | 1559698 | | 8/2005 | |
| GB | 2207365 A | * | 2/1989 | ............. B28C 5/383 |
| JP | 2008-539103 | | 11/2008 | |
| WO | 2004/103663 | | 12/2004 | |
| WO | 2006/115497 | | 11/2006 | |
| WO | 2014/087892 | | 6/2014 | |
| WO | 2015/093209 | | 6/2015 | |

OTHER PUBLICATIONS

International Search Report for PCT/JP2017/004273 dated Apr. 4, 2017.
Taiwanese Official Action for 106104080 dated Dec. 18, 2019.
Chinese Official Action for 201780010297.1 dated Jan. 22, 2020.
Jiang Jihai et al., "Hydraulic Transmission", 5th Edition, published by Harbin Institute of Technology Press, edited in Jan. 2015.
Liu Hongmin, "Fluid Mechanical Pump and Fan" published by Shanghai Jiaotong University Press, Edition 1st Edited in Mar. 2014.

* cited by examiner

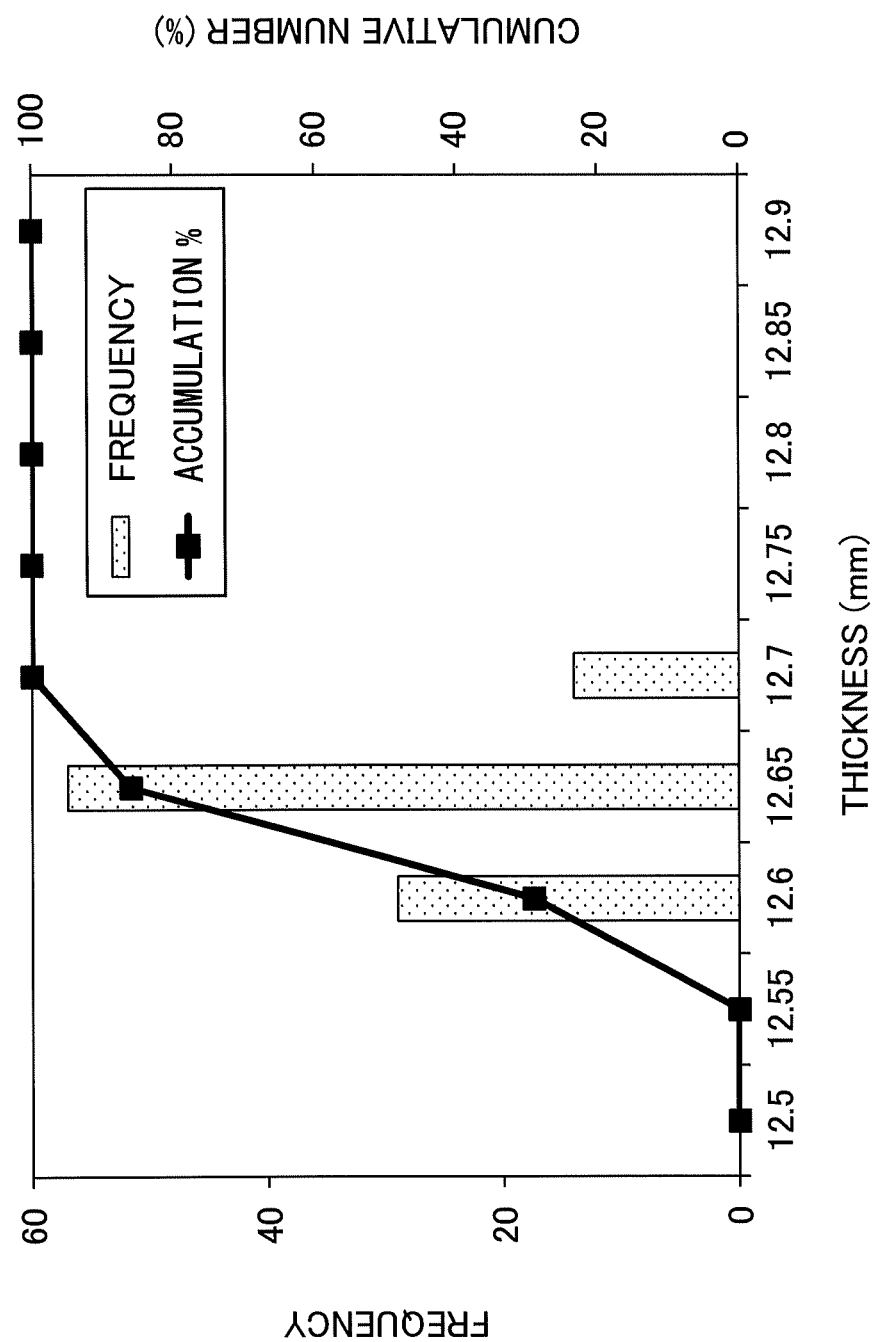

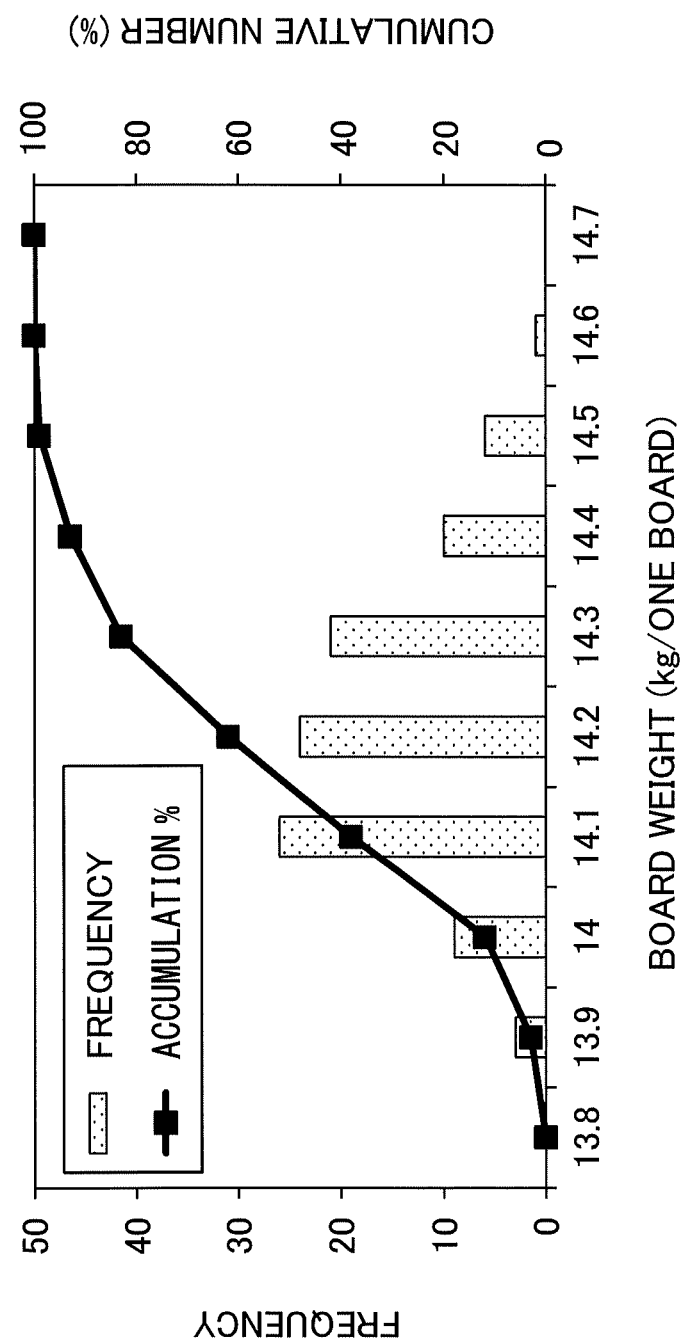

GYPSUM-BASED BOARD MATERIAL PRODUCING APPARATUS

TECHNICAL FIELD

The present invention relates to a gypsum-based board material producing apparatus.

BACKGROUND ART

Conventionally, a gypsum-based board material such as a reinforce gypsum board, a normal hard gypsum board, a glass-fiber-nonwoven-fabric-containing gypsum plate, or a glass mat gypsum board, has an excellent performance in a fireproof property or fire resistance, a sound insulation property, a heat insulation property, a workability, an economical property, and the like, and hence, has been used widely.

A gypsum-based board material can be produced by molding a gypsum slurry and hardening the molded body of the gypsum slurry. Note that when a gypsum slurry is molded to form a molded body, a base paper for a board, a glass fiber nonwoven fabric or the like can be disposed on the surface of the molded body or in the vicinity of the surface, as needed.

A gypsum slurry can be prepared by a mixer or the like mixing and stirring calcined gypsum, water and, as needed, further various additive agents such as adhesive, and in some cases, by further adding foam so as to be at a predetermined specific gravity. Hence, a gypsum-based board material producing apparatus that is used to produce a gypsum-based board material includes a mixer (a mixing and stirring machine) that mixes raw materials of a gypsum slurry, a foaming apparatus that generates foam, and the like.

In recent years, a lightweight gypsum-based board material obtained by adding foam to a gypsum slurry and including voids derived from the foam is widely produced. In a case where such a gypsum-based board material obtained by adding foam to a gypsum slurry and including voids derived from the foam is produced, if the foam is not uniformly dispersed in the gypsum slurry and the foam is agglomerated and unevenly distributed, a local expansion, defect, or the like of the surface of the gypsum-based board material may occur.

Hence, various investigations have been made on mixers that enable to uniformly disperse foam in a gypsum slurry.

For example, Patent Document 1 discloses a mixer that includes: a flattened and circular housing provided with an annular wall on its periphery; a rotary disk located in the housing to rotate in a predetermined rotational direction; a slurry outlet port opening on the annular wall to discharge from the housing, gypsum slurry mixed in the housing; a hollow connector section with an open end connected to the slurry outlet port and another open end connected to a substantially vertical and cylindrical slurry delivery conduit; and a foam feeding port for feeding foam to the gypsum slurry. The foam feeding port is provided on the annular wall on an upstream side of the slurry outlet port in the rotational direction so as to feed the foam to the gypsum slurry immediately before the gypsum slurry enters the slurry outlet port, or provided on the hollow connector section so as to feed the foam to the gypsum slurry flowing in the hollow connector section.

Further, Patent Document 2 discloses a mixer that includes a mixing area for preparing gypsum slurry; a slurry delivery section for delivering the gypsum slurry from the mixing area; and a feeding port of foam or a foaming agent for feeding the gypsum slurry in the mixing area and/or the gypsum slurry in the slurry delivery section with the foam or foaming agent under pressure. The mixer is configured to supply the gypsum slurry with the foam mixed therein, to gypsum boards or a production line for gypsum boards. The feeding port has a partition member for dividing an ejecting region of the port, and the partition member divides the ejecting region into a plurality of openings that simultaneously supply the foam or foaming agent to the gypsum slurry.

In the disclosed Patent Documents 1 and 2 described above, a mixer and a foaming apparatus (a frothing apparatus) that supplies foam are directly connected by, for example, a pipe, and a method of controlling the amount of foam generated by the foaming apparatus to control the amount of foam added to a gypsum slurry is adopted.

RELATED-ART DOCUMENTS

[Patent Document 1] International Publication Pamphlet No. WO 2004/103663
[Patent Document 2] International Publication Pamphlet No. WO 2015/093209

SUMMARY OF THE INVENTION

Problem to be Solved by the Invention

However in a case of controlling the amount of foam generated by a foaming apparatus to control the amount of foam added to a gypsum slurry, for example, due to an effect of a pressure fluctuation according to a minute change in the residual amount of a gypsum slurry in a mixer, there may be a case in which a minute change occurs in the amount of foam added to the gypsum slurry.

Although such a change in the amount of foam added to the gypsum slurry due to a pressure fluctuation in a mixer is very small, in recent years, it is required to control the specific gravity of a gypsum-based board material with high accuracy. Because the specific gravity of a gypsum-based board material varies mainly depending on the amount of foam added to a gypsum slurry, a gypsum-based board material producing apparatus is required that can precisely control an amount of foam added to a gypsum slurry regardless of an effect of a pressure fluctuation in a mixer or the like.

In view of the above-described problem, according to one aspect of the present invention, an object is to provide a gypsum-based board material producing apparatus that can precisely control an amount of foam added to a gypsum slurry.

Means for Solving the Problem

In order to solve the above-described problem, one aspect of the present invention provides a gypsum-based board producing apparatus including: a mixer configured to prepare a gypsum slurry; a foaming apparatus; and a pump configured to convey foam generated by the foaming apparatus to the mixer, wherein the pump is a positive displacement pump.

Advantageous Effects of the Invention

According to one aspect of the present invention, it is possible to provide a gypsum-based board material producing apparatus that can precisely control an amount of foam added to a gypsum slurry.

BRIEF DESCRIPTION OF THE DRAWINGS

FIG. 7B illustrates a frequency distribution of thicknesses of the gypsum boards according to Example 1;

FIG. 8A illustrates a frequency distribution of board weights of gypsum boards according to Comparative Example 1.

MODE FOR CARRYING OUT THE INVENTION

In the following, embodiments for carrying out the present invention are described with reference to the accompanying drawings. However, the present invention is not limited to the embodiments described below, and various variations and modifications of the embodiments described below may be made without departing from the scope of the present invention.

A configuration example of a gypsum-based board material producing apparatus according to the present embodiment will be described.

A gypsum-based board material producing apparatus according to the present embodiment can include a mixer configured to prepare a gypsum slurry; a foaming apparatus; and a pump configured to convey foam generated by the foaming apparatus to the mixer, wherein the pump can be a positive displacement pump.

A gypsum-based board material producing apparatus according to the present embodiment will be described with reference to FIG. 1.

Figure 1:
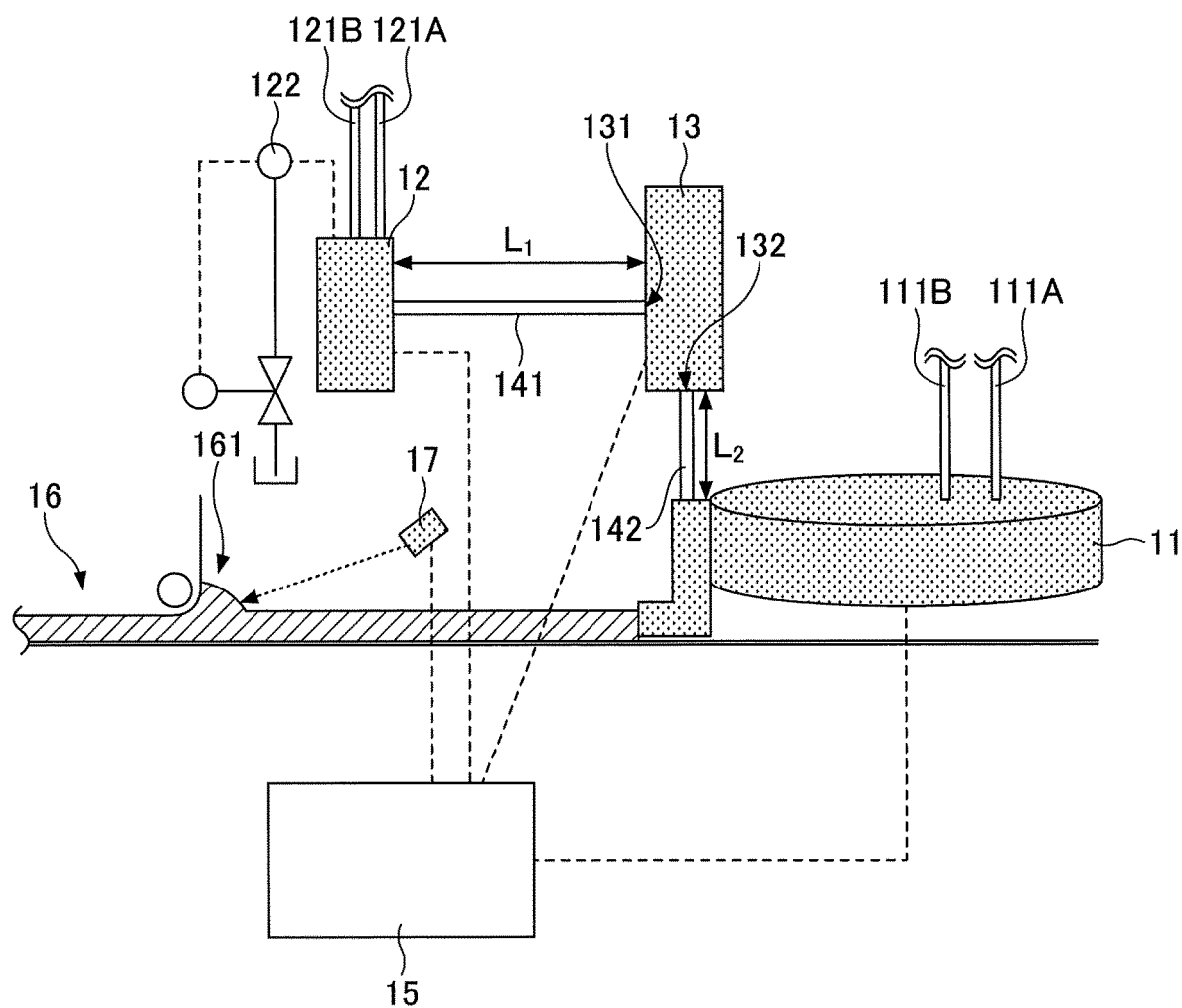
FIG. 1 is a schematic view of a gypsum-based board material producing apparatus according to an embodiment of the present invention.

FIG. 1 illustrates a schematic view of a gypsum-based board material producing apparatus 10 according to the present embodiment. As illustrated in FIG. 1, the gypsum-based board material producing apparatus 10 according to the present embodiment can include a mixer 11 that prepares a gypsum slurry, a foaming apparatus 12, a pump 13 that conveys and introduces, to the mixer 11, foam generated by the foaming apparatus 12.

For example, as illustrated in FIG. 1 the foaming apparatus 12 and the pump 13 can be connected by a pipe 141, and the pump 13 and the mixer 11 can be connected by a pipe 142. The foaming apparatus 12, the pump 13, and the mixer 11 can be connected in series by the pipes 141 and 142. Then, the foam generated in the foaming apparatus 12 can be supplied to the pump 13 through the pipe 141, and further can be supplied from the pump 13 to the mixer 11 through the pipe 142. That is, the pump 13 can be disposed between the foaming apparatus 12 and the mixer 11 in the conveying path of the foam.

Note that although the pipes 141 and 142 are not particularly limited, for example, a tubular body made of metal or of resin, specifically, for example, a pipe made of metal or of resin, a hose, or the like can be used as the pipes 141 and 142.

Each member will be described below.

First, a configuration example of the mixer 11 will be described.

The mixer 11 is not particularly limited, and various mixers that are mixers capable of mixing raw materials to prepare a gypsum slurry can be used as the mixer 11.

The mixer 11 can include a raw material supply part, a mixing area, and a slurry delivery part.

Therefore, for example, the mixer 11 can include, as the raw material supply part, a powder supply port (not illustrated) for supplying a powder component into the mixing area and a liquid supply port (not illustrated) for supplying a liquid component into the mixing area. The powder supply port can be connected to, for example, a powder supply pipe 111A for supplying the powder component. Further, the liquid supply port can be connected to a liquid supply pipe 111B for supplying the liquid component. Note that a part or the entirety of the powder supply pipe 111A and the liquid supply pipe 111B can constitute a part of the raw material supply unit.

Then, a gypsum slurry can be prepared by stirring and mixing, in the mixing area, the powder component and the liquid component supplied from these supply pipes.

A specific configuration example of the mixer 11 will be described with reference to FIG. 2 to FIG. 4.

Figure 2:
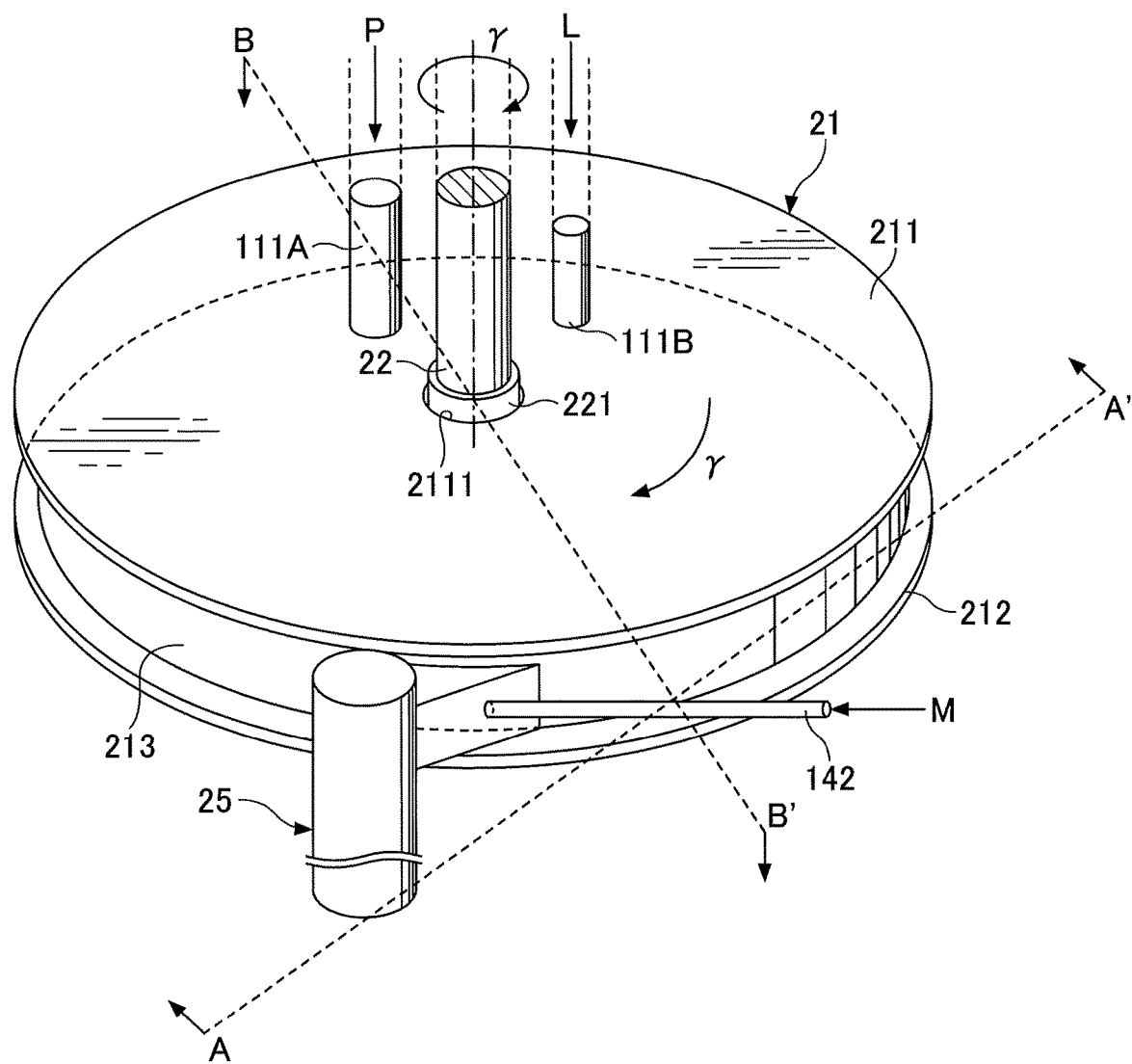
FIG. 2 is a perspective view of a mixer according to the embodiment of the present invention.
Figure 3:
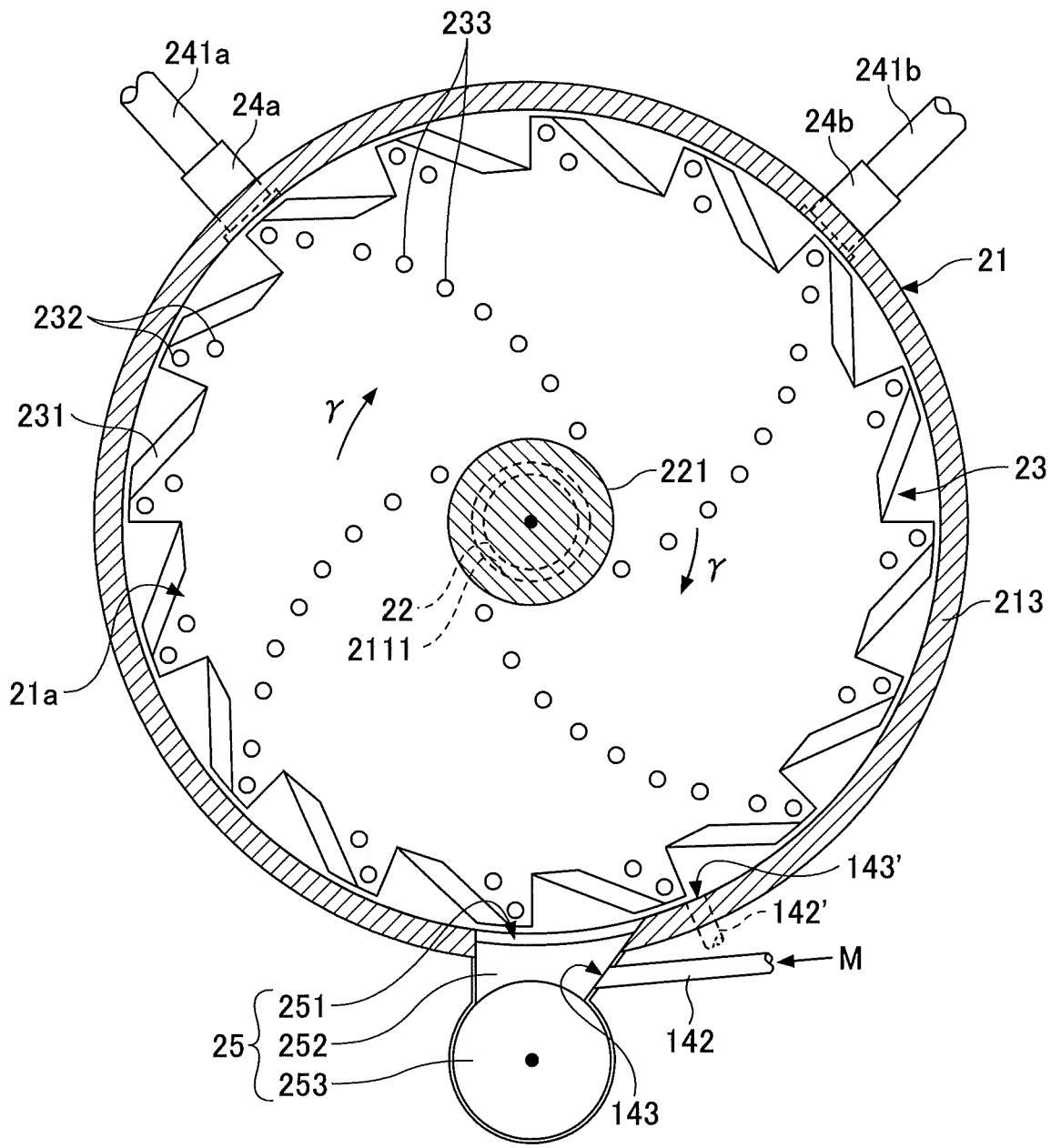
FIG. 3 is a cross-sectional view of the mixer according to the embodiment of the present invention.

FIG. 2 is a perspective view illustrating an entire structure of the mixer 11, and FIG. 3 is a cross-sectional view taken along line A-A' of FIG. 2 and illustrates an internal structure of the mixer 11. FIG. 4 is a cross-sectional view taken along line B-B' of FIG. 2 and illustrates an internal structure of the mixer 11. Note that the same reference numerals are attached to the same members. Note that in FIG. 4, description of the powder supply pipe 111A is omitted. As illustrated in FIG. 2, the mixer 11 can include a flattened cylindrical housing 21. The housing 21 can include an upper plate 211 having a horizontal disk shape, a lower plate 212 having a horizontal disk shape, and a peripheral wall 213 arranged at a peripheral portion between the upper plate 211 and the lower plate 212. The upper plate 211 and the lower plate 212 are separated by a predetermined distance in the vertical direction, and form a mixing area 21a (see FIG. 3 and FIG. 4) in the mixer 11 so that a powder component P and a liquid component L supplied into the housing 21 of the mixer 11 can be mixed. A circular opening portion 2111 is formed at a center part of the upper plate 211, such that an enlarged lower end portion 221 of a rotatable shaft 22 perpendicular to the upper plate 211 can pass through the circular opening portion 2111.

The rotatable shaft 22 can be connected, for example, to a rotation driving device (not illustrated) such as an electric motor, and can be rotated in the clockwise direction indicated by y in the figure, for example. Note that if desired, a transmission or the like may be provided between the rotation driving device (not illustrated) and between the rotatable shaft 22.

The powder supply pipe 111A for supplying, into the mixing area 21a, the powder component P to be mixed in the mixer 11 can be connected to the upper plate 211. Further, the liquid supply pipe 111B for supplying, into the mixing area 21a, the liquid component L to be mixed in the mixer 11 can also be connected to the upper plate 211.

Note that in order to prevent an internal pressure in the mixer 11, for example, in the mixing area 21a from excessively increasing, an internal pressure adjustor or the like (not illustrated) may be provided on a part of the housing 21, for example, on the upper plate 211.

The powder component P and the liquid component L are not particularly limited, and can be selected as desired in accordance with a gypsum-based board material to be produced. For example, as the powder component P, for example, various additive agents may be included such as calcined gypsum, an adhesion improving agent, an inorganic fiber, a lightweight aggregate, a refractory material, a setting modifier, a setting accelerator, a water reducing agent, a foam diameter adjusting agent, a water repellent, etc. Also, as the liquid component L, for example, various additive agents may be included such as water, a liquid setting modifier, a setting accelerator, a water reducing agent, a foam diameter adjusting agent, a water repellent, etc. Here, although an example is illustrated in which one powder supply pipe 111A and one liquid supply pipe 111B are arranged, it is not limited to such an embodiment, and a plurality of powder supply pipes and a plurality of liquid supply pipes may be provided as needed.

The structure inside the housing 21 of the mixer 11 will be described with reference to FIG. 3 and FIG. 4. A rotary disk 23 is rotatably arranged in the housing 21. A center portion of the rotary disk 23 is fixed to the lower end surface of the enlarged lower end portion 221 of the rotatable shaft 22. Therefore, the rotary disk 23 can rotate together with the rotatable shaft 22, for example, in the y direction.

The rotary disk 23 can include a large number of tooth-shaped portions 231 on its outer peripheral area. A plurality of lower pins 232 can be fixed perpendicularly to the upper surface of the rotary disk on the tooth-shaped portions 231. Further, on an area inward with respect to the tooth-shaped portions 231 of the rotary disk 23, a plurality of lower pins 233 can be fixed to be perpendicular to the upper surface of the rotary disk 23.

Figure 4:
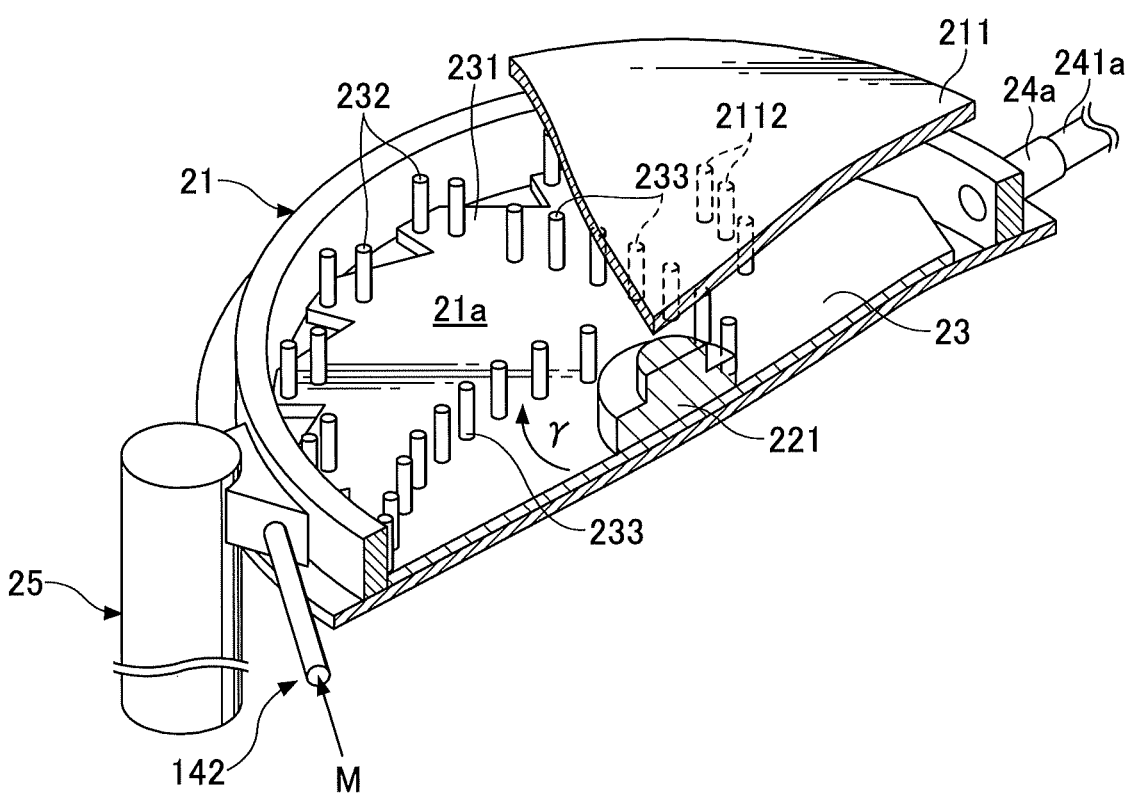
FIG. 4 is a cross-sectional view of the mixer according to the embodiment of the present invention.

As illustrated in FIG. 4, a plurality of upper pins 2112, which hang in the mixing area 21a, can be fixed to the upper plate 211. The lower pins 233 and the upper pins 2112 are alternately arranged in the radial direction of the rotary disk 23 so that, when the rotary disk 23 rotates, the lower pins 233 and the upper pins 2112 can relatively move to mix and stir the materials of the gypsum slurry introduced in the housing 21.

At the time of preparing the gypsum slurry, a rotation driving device (not illustrated) of the mixer is driven to transmit driving force to the rotary disk 23 through the rotatable shaft 22 and the enlarged lower end portion 221 such that the rotary disk 23 can rotate in the y direction. At that time, the powder component P and the liquid component L, which are the raw materials of the gypsum slurry, can be supplied from the powder supply pipe 111A and the liquid supply pipe 111B into the mixing area 21a simultaneously. While being stirred and mixed, the powder component P and the liquid component L, which are the raw materials of the gypsum slurry and supplied into the mixing area 21a, are pressed outwardly and forwardly in the rotation direction by the action of centrifugal force and by the tooth-shaped portions 231 and move outwardly on the rotary disk 23 to flow in the circumferential direction at the peripheral area.

Here, as illustrated in FIG. 3, it is possible to provide, on the peripheral wall 213, the slurry delivery part 25 and fractionation ports 24a and 24b for extracting, to the outside the mixer 11, the gypsum slurry prepared by mixing the powder component P with the liquid component L in the mixing area 21a of the mixer 11. Note that the slurry delivery part 25 and the fractionation ports 24a and 24b may be provided on the lower plate 212.

As illustrated in FIG. 3 and FIG. 4, for example, fractionation pipes 241a and 241b are respectively connected to the fractionation ports 24a and 24b such that the prepared gypsum slurry can be supplied to, for example, a molding machine or the like via the fractionation pipes 241a and 241b. Note that, although an example is illustrated here in which foam is not added to the gypsum slurry taken out at the fractionation ports 24a and 24b, but it is not limited to such an embodiment. For example, as is conventionally known, foam may also be added at the fractionation ports 24a and 24b to add the foam to the prepared gypsum slurry. Note that in a case where foam is added to a gypsum slurry at the fractionation ports 24a and 24b, the foam may be directly supplied and added from the foaming apparatus 12 to the fractionation ports 24a and 24b, for example.

The slurry delivery part 25 can include a slurry delivery port 251 provided on the peripheral wall 213, a hollow connection part 252 connected to the slurry delivery port, and a vertical chute 253.

In addition, a foam supply port 143 for supplying, to the gypsum slurry, foam conveyed by the pump 13 can be disposed (opened) on the slurry delivery part 25. Specifically, for example, the foam supply port 143 can be disposed (opened) on the hollow connection part 252 of the slurry delivery part 25. The pipe 142 connected to the pump 13 described above is connected to the slurry delivery part 25 at the foam supply port 143, and can be connected via the foam supply port 143 to the slurry delivery part 25, for example, to the hollow connection part 252.

With such a configuration, it is possible to add foam M to the gypsum slurry, prepared in the mixing area 21a, immediately after flowing to the hollow connection part 252 via the slurry delivery port 251. The gypsum slurry, to which the foam has been added, further advances toward the vertical chute 253 at the downstream side, and the foam can be uniformly dispersed in the gypsum slurry by a rotational motion along the inner peripheral wall surface in the vertical chute 253.

Note that in a case where foam is added at the slurry delivery part 25, it is not limited to an embodiment in which the foam supply port 143 is disposed on the hollow connection part 252 and the pipe 142 is connected to the foam supply port 143. For example, a foam supply port may be provided at the downstream side with respect to the hollow connection part 252, and the pipe 142 may be connected to the foam supply port.

Also, the pipe 142 connecting the pump 13 and the mixer 11 and the foam supply port 143 are not limited to an embodiment that is connected to the slurry delivery part 25 of the mixer 11, and, for example, as illustrated by the dotted line in FIG. 3, they may be a pipe 142' and a foam supply part 143' connected to the peripheral wall 213. According to such a method of supplying foam, the foam is added to the gypsum slurry immediately before being discharged from the mixing area 21a via the slurry delivery port 251, and it is possible to prepare the gypsum slurry to which the foam has been added as in a case where the pipe 142 is connected to the hollow connection part 252.

As described above, the gypsum slurry, in which the foam has been added and dispersed at the slurry delivery part 25, the mixing area 21*a*, or the like, can flow down the vertical chute 253 and be supplied to a molding machine or the like. Note that although FIG. 2 and FIG. 4 illustrate an embodiment in which a short cylindrical straight pipe is used as the vertical chute 253, the vertical chute 253 is not limited to such an embodiment. For example, a part may be cylindrical as illustrated in FIG. 2 and FIG. 4, and, at the downstream side in the conveying direction of the gypsum slurry supplied to a molding machine, a hose like desired shape may be used. In this case, at the downstream side with respect to the vertical chute 253, a bent portion, a curved portion, or the like may be included in accordance with the layout of the mixer 11 and a molding unit 16. Further, in place of the vertical chute 253, a chute having a hose shape can be connected to the hollow connection part 252. That is, it is possible to connect a chute having a hose shape directly to the hollow connection part 252 without providing the vertical chute 253. In this case, similarly to the case of the vertical chute 253, it is possible to uniformly disperse foam in the gypsum slurry in the chute having a hose shape. Also, the chute having a hose shape may include a bent portion, a curved portion, or the like in accordance with the layout of the mixer 11 and the molding unit 16.

Although a configuration example of the mixer 11 has been described above, the mixer 11 is not limited to such an embodiment. It is possible to use various types of mixers that can prepare a gypsum slurry by mixing a powder component P and a liquid component L, which are raw materials, and that can add foam to the prepared gypsum slurry.

Next, the foaming apparatus 12 will be described. In the foaming apparatus 12, for example, foam can be generated (produced) by using a foaming agent. Therefore, as illustrated in FIG. 1, a foaming agent supply pipe 121A for supplying a foaming agent, an air supply pipe 121B for supplying air, and the like can be connected to the foaming apparatus 12. Note that a water supply pipe or the like for supplying water (not illustrated) may be provided as needed.

In the foaming apparatus 12, a method of generating foam from a foaming agent is not particularly limited, and a pre-foaming method such that air is blown into a foaming agent may be used, for example.

In a case of generating foam by the pre-foaming method, the foaming apparatus 12 can include a foaming agent receiving tank that mainly receives a foaming agent stock solution. Note that the foaming agent supply pipe 121A described above can be connected to the foaming agent receiving tank.

Also, the foaming apparatus 12 may further include a pump for pumping a constant amount of the foaming agent stock solution from the foaming agent receiving tank, and a foaming part that blows compressed air into the foaming agent stock solution pumped from the foaming agent receiving tank and stirs an obtained mixture of the foaming agent stock solution and air to generate foam from the foaming agent stock solution. Note that the above described air supply pipe 121B can be connected to the foaming part.

A method of generating foam from a foaming agent is not limited to an embodiment in which compressed air is blown into a foaming agent stock solution and an obtained mixture of the foaming agent stock solution and air is stirred.

For example, foam may be generated by, after diluting in advance a stock solution of a foaming agent with water so as to be at a predetermined dilution rate to prepare the foaming agent diluted solution, blowing air into the foaming agent diluted solution, and stirring an obtained mixture of the foaming agent diluted solution and air.

In this case, the foaming apparatus 12 may further include a water tank for storing water and a pump for pumping out a constant amount of water from the water tank. Also, the foaming apparatus 12 may further include a diluting tank for diluting the foaming agent with water so as to be at a predetermined dilution rate to make a diluted aqueous solution of a foaming agent stock solution, and a pump for pumping out a constant amount of the foaming agent diluted solution.

In a foaming part of the foaming apparatus 12, a method of stirring a mixture of a foaming agent stock solution or a foaming agent diluted solution and air is not particularly limited, and for example, a shear force generated by high-speed stirring may be applied to stir and generate foam. It is also possible to stir by causing a mixture of a foaming agent stock solution or a foaming agent diluted solution and air to pass into fine granular beads.

Note that in order to obtain a constant amount of foam by improving the quantitative precision for the foaming agent, water, and air, a known flowmeter may be provided in the way of a pipeline for delivering each substance so as to automatically control the rate of flow of each substance based on the detection value by the flowmeter. The foaming agent used in the foaming apparatus 12 is not particularly limited, and anionic, cationic, non-ionic and amphoteric surface active agents may be used, which agents are conventionally used to produce gypsum-based materials. The foaming agent is preferably an anionic surface active agent. Particularly preferable examples of the foaming agent include sulfates of alkyls, alkyl aryls, alkyl ethers, alkyl aryl ethers, polyoxyethylene alkyl ethers (polyethyleneoxide alkyl ethers), and polyoxyethylene polyoxypropylene alkyl ethers (polyethyleneoxide polypropyleneoxide alkyl ethers) etc.

The amount of foam generated by the foaming apparatus 12 is not particularly limited. It is preferable that the amount of foam generated by the foaming apparatus 12 per unit time is greater than or equal to the amount of foam conveyed by the pump 13 to the mixer 11 per unit time. This is because if the amount of foam generated by the foaming apparatus 12 per unit time is less than the amount of foam conveyed by the pump 13 to the mixer 11 per unit time, there is a possibility that a before-foamed foaming agent supplied into the foaming part of the foaming apparatus 12 is conveyed by the pump 13.

Although the foam generated by the foaming apparatus 12 may be directly conveyed to the mixer 11 via the pump 13, a service tank (buffer), which is not illustrated, may be provided between the foaming apparatus 12 and the pump 13 such that the foam is stored in the service tank. Note that the location where the service tank is provided is not particularly limited. For example, the service tank may be provided in the foaming apparatus 12 or the like.

In a case where the foam generated by the foaming apparatus 12 is directly conveyed to the mixer 11 via the pump 13 and the amount of foam generated by the foaming apparatus 12 per unit time is less than the amount of foam conveyed by the pump 13 per unit time, the foam may be stored in the pipe 141 or the like.

Note that in such a case where the foam is stored in the pipe 141 or a service tank, so as to prevent an internal pressure in these members from excessively increasing, it is preferable to provide a unit for releasing the foam, such as a back pressure valve 122, for when the pressure becomes equal to or higher than a predetermined pressure. Note that although FIG. 1 illustrates an example in which the back pressure valve 122 is connected to the foaming apparatus 12, the unit for releasing the foam is not limited to such an embodiment, and may be connected to for example, the pipe 141, a service tank or the like.

Instead of the unit for releasing the foam or in addition to the unit for releasing the foam, a pressure meter, which is not illustrated, can be provided at the pipe 141 or the service tank, and a control unit 15 that controls the foaming apparatus 12 can be provided. In this case, when the pressured detected by the pressure meter becomes equal to or higher than a certain level, the control unit 15 can perform control to stop the foaming apparatus 12 generating the foam until the pressure detected by the pressure gauge drops.

Next, the pump 13 will be described.

As described above, a conventional gypsum-based board material producing apparatus has a configuration in which an foaming apparatus and a mixer are connected directly by a pipe, and has a problem in which, due to a minute pressure fluctuation in the mixer, an additive amount of foam also fluctuates. Then, the inventors of the present invention have conducted investigations, and found that by arranging, between the foaming apparatus 12 and the mixer 11, the pump 13 separately from the foaming apparatus 12 and the mixer 11, it is possible to suppress the effect of a minute pressure fluctuation in the mixer, and to control precisely the amount of foam added to a gypsum slurry.

It is considered that this is because a minute pressure fluctuation in the mixer 11 can be controlled against by supplying, to the mixer 11 by the pump 13, the foam generated by the foaming apparatus 12. However, depending on types of pumps, due to its structure, there is a possibility that an excessive pressure is applied to foam, deformed foam is added to a gypsum slurry, and foam is broken.

Hence, as a result of further investigations on pumps to be used, it was found that, depending on types of pumps, when a gypsum slurry to which foam has been added is hardened to form a gypsum hardened body, the shapes of voids derived from foam contained in the gypsum hardened body differ.

Differences in the shapes of voids derived from foam contained in gypsum-based board materials obtained by hardening the gypsum slurry to which the foam has been added according to types of used pumps will be described with reference to FIG. 5A to FIG. 5C.

Figure 5A:
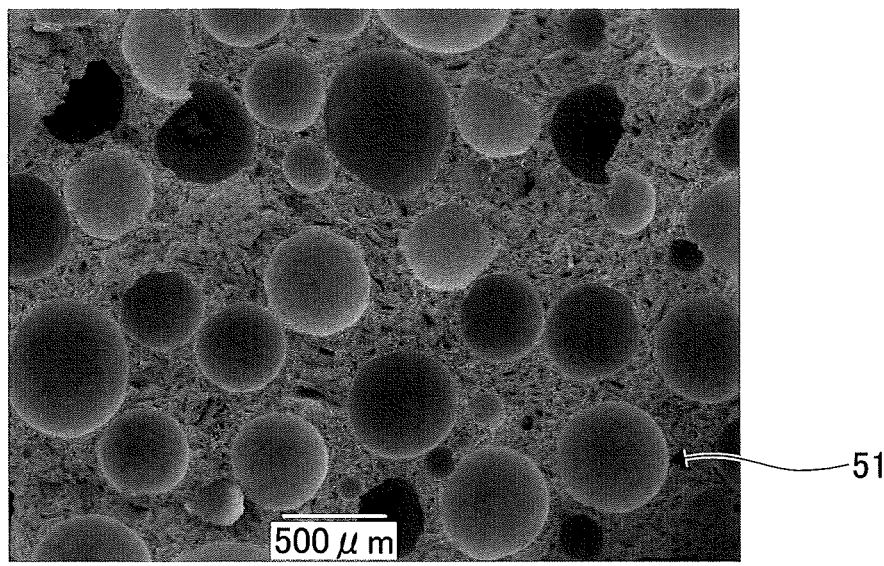
FIG. 5A is an explanatory diagram of a difference in shape of voids derived from foam in a gypsum-based board material depending on a type of a pump according to the embodiment of the present invention.

FIG. 5A is a view, enlarged by a scanning electron microscope (SEM), of a cross section of a gypsum-based board material obtained by hardening the gypsum slurry, to which the foam has been added, and prepared by the gypsum-based board material producing apparatus 10 in which a screw pump, which is a rotary pump among positive displacement pumps, is arranged as the pump 13 between the foaming apparatus 12 and the mixer 11.

Figure 5B:
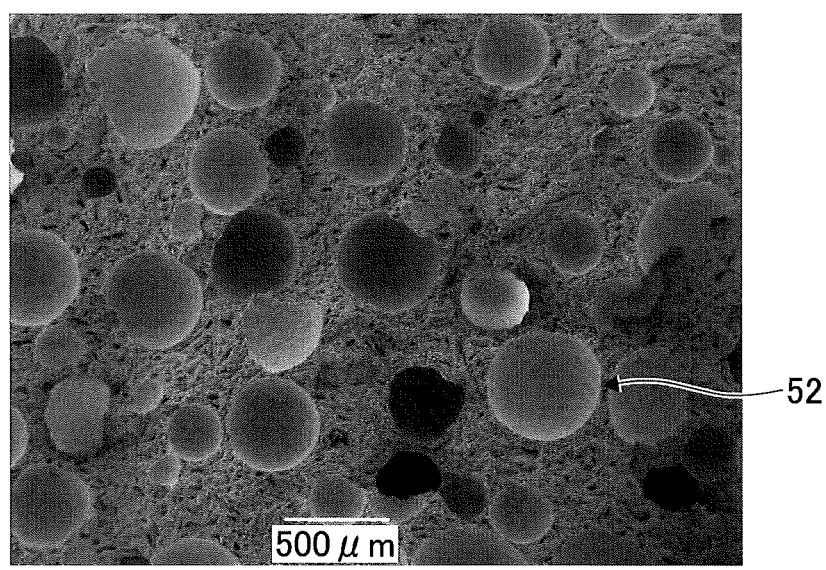
FIG. 5B is an explanatory diagram of a difference in shape of voids derived from foam in a gypsum-based board material depending on a type of a pump according to the embodiment of the present invention.

Further, FIG. 5B is a view, similarly enlarged, of a cross section of a gypsum-based board material generated in a manner similar to that of the gypsum-based board material of FIG. 5A except that a diaphragm pump, which is a reciprocating pump among positive displacement pumps, is used as the pump 13.

Note that a positive displacement pump is a pump that changes the volume of a fluid substance material such as a slurry in a fixed space volume by reciprocating motion or rotary motion, gives energy to the fluid substance, and conveys the fluid substance. Among such positive displacement pumps, a rotary pump is a pump that sucks and discharges a fluid substance by rotary motion of a rotating component, and among such positive displacement pumps, a reciprocating pump is a pump that sucks and discharges a fluid substance by reciprocating motion of a component.

Figure 5C:
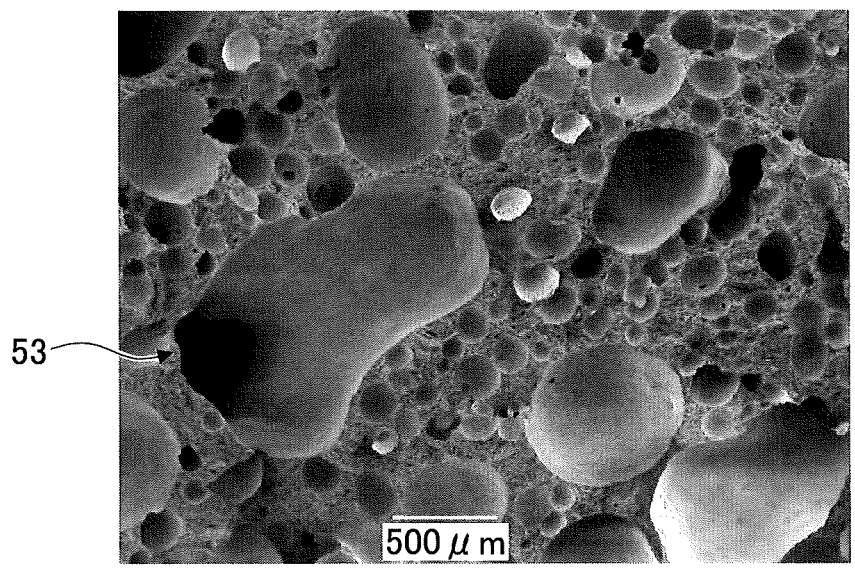
FIG. 5C is an explanatory diagram of a difference in shape of voids derived from foam in a gypsum-based board material depending on a type of a pump according to the embodiment of the present invention.

FIG. 5C is a view, similarly enlarged, of a cross section of a gypsum-based board material generated in a manner similar to that of the gypsum-based board material of FIG. 5A except that a volute pump, which is a centrifugal pump that rotates an impeller in a casing to apply energy to a liquid using a centrifugal force, is used as the pump 13.

It can be confirmed that the voids 51 and 52 derived from foam in the gypsum-based board materials generated by using the positive displacement pumps as the pumps 13 illustrated in FIG. 5A and FIG. 5B have a substantially spherical shape and their sizes are also substantially uniform. In contrast, it can be confirmed that a void 53 derived from foam in the gypsum-based board material generated by using a volute pump that is a centrifugal pump as the pump 13 illustrated in FIG. 5C is amorphous, and has a variation in its size in comparison with the cases of the gypsum-based board materials of FIG. 5A and FIG. 5B. Note that for every case, the operating conditions of the pump were changed to generate gypsum-based board materials, and the analysis was carried out similarly, but the same tendency was obtained.

When the gypsum-based board material illustrated in FIG. 5C is produced, the foam is added to a gypsum slurry by using a volute pump as described, and it is considered that, by the volute pump, a strong external force is applied to the foam generated by a foaming apparatus, and the foam in a deformed state is added to the gypsum slurry. When the foam in a deformed state is added to the gypsum slurry as described above, because the foam tends to aggregate easily, the size of the foam in the gypsum slurry varies.

For this reason, it is considered that, when a volute pump that is not a positive displacement pump is used as the pump 13, as illustrated in FIG. 5O, the shape of the void 53 derived from the foam is amorphous and variations in the size are observed.

Note that although FIG. 5C illustrates the microscopic analysis results of a gypsum-based board material, if foam aggregates and large foam is generated in the gypsum slurry when a gypsum-based board material is produced as illustrated in FIG. 5C, there is a possibility that, in the obtained gypsum-based board material, extremely large voids derived from the foam occur and a part of gypsum appears to be missing. Also, there is a possibility that, due to the large foam generated in the gypsum slurry, an expansion may occur in a surface covering material such as board base paper arranged on the surface of the gypsum-based board material.

With respect to the above, the positive displacement pumps used in generating the gypsum-based board materials illustrated in FIG. 5A and FIG. 5B can convey the foam from the foaming apparatus to the mixer without applying an excessive force to the foam, regardless of the operating conditions. Therefore, as illustrated in FIGS. 5A and 5B, it is possible to obtain the gypsum-based board materials including the voids 51 and 52, derived from the foam, having a substantially spherical shape and that are substantially uniform in size.

Among positive displacement pumps, a rotary pump is a pump that performs a suction and discharge operation by rotary motion of a rotor or a gear, and in particular, can add foam to a gypsum slurry without applying an excessive force to the foam. Hence, as illustrated in FIG. 5A, in a case where a rotary pump is used as the pump 13, in particular, it is possible to suppress, in a gypsum slurry, the foam from being deformed and the foam from aggregating together. In addition, an occurrence of foam breakage can be suppressed.

Therefore, as illustrated in FIG. 5A, in particular, in the obtained gypsum-based board material, the voids derived from the foam have a substantially spherical shape and the size of the voids derived from the foam can also be made substantially uniform. Further, in the obtained gypsum-based board material, it is possible to suppress extremely large voids from occurring in a gypsum core and an expansion from occurring in a surface covering material.

From the above described investigation results, it is possible to preferably use, as the pump 13, a positive displacement pump that can convey the foam produced by the foaming apparatus 12 without applying an excessive force to the foam. Specifically, it is possible to use a reciprocating pump, such as a diaphragm pump or a piston pump, or a rotary pump, such as a gear pump, a vane pump, a screw pump.

As the pump 13, in particular, a rotary pump can be used preferably, and a screw pump can be used more preferably. A screw pump is a type of a pump that transports an object using one or more screw type rotors.

In a screw pump, a screw type rotor rotates in a stator such that a series of independent sealed spaces called cavities are created in gaps between the rotor and the stator. Then, by the rotator rotating in the stator, the cavities move towards the discharge side while generating a strong suction force such that transport can be made without adding an excessive force to foam.

According to such a screw pump, because a constant transport quantity can be realized without pulsation, the amount of foam added to a gypsum slurry can be controlled particularly precisely, and such a screw pump can be used more preferably as the pump 13 as described above.

Among screw pumps, a uniaxial screw pump can be particularly preferably used. As a uniaxial screw pump, for example, a uniaxial eccentric screw pump (MONO pump (registered trademark) which may be called MOYNO pump) is known and can be preferably used.

As described above, in a gypsum-based board material producing apparatus according to the present embodiment, the pump 13 can be arranged between the foaming apparatus 12 and the mixer 11. In this case, although the distance between the foaming apparatus 12 and the pump 13 and the distance between the pump 13 and the mixer 11 are not particularly limited, in terms of suppressing the effect of a pressure fluctuation in the mixer 11 with respect to a supply of foam, it is preferable that the pump 13 is arranged as close to the mixer 11 as possible.

Therefore, it is preferable that a length L2 of the pipe 142 that connects the pump 13 and the mixer 11 is shorter a length L1 of the pipe 141 that connects the foaming apparatus 12 and the pump 13. This is because it is preferable to arrange the pump 13 in the vicinity of the mixer 11 as described above.

As described above, conventionally, a foaming apparatus and a mixer are directly connected by a pipe. Therefore, it is impossible to supply foam to the mixer side unless the pressure at the foaming apparatus side is higher than that at the mixer side. Conversely, when the foaming apparatus foams foam, because the pressure greatly affects the amount and the shape of the foam to be generated, it is impossible to extremely increase the pressure at the foaming apparatus side. Further, receiving a pressure fluctuation of the mixer, there is a possibility that the amount and the shape of foam generated by the foaming apparatus are affected.

With respect to the above, in the gypsum-based board material producing apparatus 10 according to the present embodiment, by a feeding function of the pump 13, a constant amount of foam can be supplied from the foaming apparatus 12 to the mixer 11 irrespective of the pressure between the foaming apparatus 12 and the mixer 11. More specifically, even if either one of the pressure at the foam suction port 131 (see FIG. 1) of the pump 13 and the pressure at the foam discharge port 132 of the pump 13 is higher than the other, it is possible to supply a constant amount of foam from the foam supply port 143 provided on the mixer 11. Also, the supply amount of foam is not affected by a pressure fluctuation from the mixer side.

Therefore, in the gypsum-based board material producing apparatus 10 according to the present embodiment, a pressure at the foam suction port 131 and a pressure at the foam discharge port 132 are not particularly limited.

Note that the foam suction port 131 of the pump 13 referred to here is an opening portion through which the pump 13 sucks the foam conveyed from the foaming apparatus 12, and the pipe 141, which connects the foaming apparatus 12 and the pump 13, is connected to the pump 13 at the foam suction port 131. Also, the foam discharge port 132 of the pump 13 referred to here is an opening portion through which the pump 13 discharges the foam conveyed from the foaming apparatus 12, and the pipe 142, which connects the pump 13 and the foam supply port 143, is connected to the pump 13 at the foam discharge port 132.

Although members included in the gypsum-based board material producing apparatus 10 according to the present embodiment have been described above, the gypsum-based board material producing apparatus 10 according to the present embodiment may include various members as needed other than the foaming apparatus 12, the pump 13, and the mixer 11 described above.

The gypsum-based board material producing apparatus 10 according to the present embodiment may include the molding unit 16 as illustrated in FIG. 1, for example. A configuration example of the molding unit 16 will be described with reference to FIG. 6. Note that the same reference numerals are attached to the members that are common to the members described with reference to the drawings so far.

The molding unit 16 can mold and process the gypsum slurry prepared by the mixer 11 into a gypsum-based board material having a desired shape and size.

A front face cover base paper (base paper for board) 61 that is a surface material is conveyed along a production line from a right side to a left side in the figure.

The mixer 11 can be arranged at a predetermined position associated with a conveyance line, for example, above or laterally to a conveyance line. Because the mixer 11 has already been described, its detailed description is omitted.

A gypsum slurry 63 obtained in the mixer 11 is extracted from the fractionation ports 24a and 24b of the mixer, and supplied, onto the front face cover base paper (board base paper) 61 and a back face cover base paper (board base paper) 62 through the fractionation pipes 241a and 241b at upstream sides in the conveying directions of the roll coaters 64.

The gypsum slurry 63 supplied onto each of the front face cover base paper 61 and the back face cover base paper 62 reaches spreading parts of the roll coaters 64 and is spread by the spreading parts. Note that the roll coaters 64 can include applying rolls 641, backing rolls 642, and residue removing rolls 643. When the cover base papers pass between the applying rolls 641 and the backing rolls 642, it is possible to spread the gypsum slurry 63 on the front face cover base paper 61 and the back face cover base paper 62.

Figure 6:
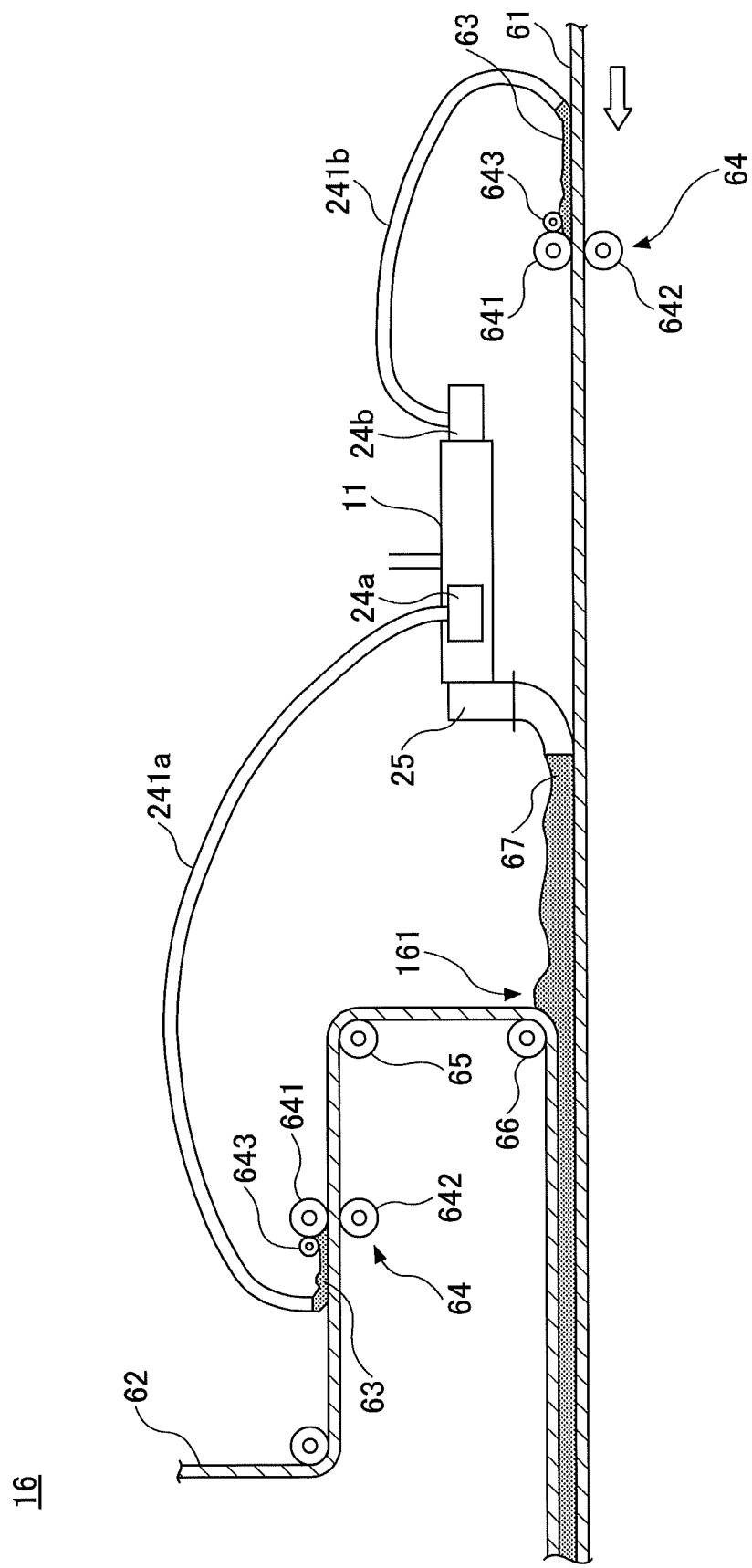
FIG. 6 is an explanatory diagram of a molding unit according to the embodiment of the present invention.

In this way, both a thin layer of the gypsum slurry 63 and a marginal area are formed on the front face cover base paper 61. Further, a thin layer of the gypsum slurry 63 is similarly formed on the back face cover base paper 62. Note that although FIG. 6 illustrates an example in which the roll coaters 64 are used to apply the gypsum slurry 63 to the front face cover base paper 61 and the back face cover base paper 62, but it is not limited to such an embodiment. For example, the gypsum slurry 63 may be applied to only one of the front face cover base paper 61 and the back face cover base paper 62 by using a roll coater 64. Further, the gypsum slurry 63 can be disposed only at the side edges of the front face cover base paper 61.

The front face cover base paper 61 is conveyed without changing the direction. The back face cover base paper 62 is turned by a turning roller 65 to the conveying line direction of the front face cover base paper 61. Then, both the front face cover base paper 61 and the back face cover base paper 62 reach the molding machine 66.

A gypsum slurry 67 to which the foam has been added is supplied from the mixer 11 via the slurry delivery part 25 to the front of the molding machine 66. A staying gypsum slurry 161, supplied from the mixer 11 and is the gypsum slurry 67 containing the foam, staying in front of the molding machine 66, is molded by the molding machine 66 to be a layer between the thin layers formed on the front face cover base paper 61 and the back face cover base paper 62 such that a molded body can be formed.

As described above, the molded body of the gypsum slurry that is a continuous stacked body having a structure of three layers made of the front face cover base paper 61, the gypsum slurry, and the back face cover base paper 62 is formed.

Although the foam is added to only the gypsum slurry 67 that is supplied from the slurry delivery part 25 in the embodiment described as an example here, as is conventionally known, foam may also be added at the fractionation port 24a and/or the fractionation port 24b to the gypsum slurry to make the gypsum slurry containing the foam. Note that in a case where the foam is added to the gypsum slurry at the fractionation ports 24a and 24b, the foam can be directly supplied and added from the foaming apparatus 12 to the fractionation ports 24a and 24b, for example.

After being molded into a desired shape by the molding machine 66, through a hydration reaction, calcined gypsum (hemihydrate gypsum) in the gypsum slurry forms acicular crystals of dihydrate gypsum, sets, solidifies, hardens, and becomes a gypsum-based board material.

Note that although an example is described here in which the molding unit produces a gypsum board, it is not limited to such an embodiment.

Examples of the gypsum-based board material include a gypsum board, a glass mat gypsum board, a glass-fiber-nonwoven-fabric-containing gypsum board, a slag gypsum board, and the like. At the molding unit, the board base paper, which is a surface material, may be replaced with a glass fiber nonwoven fabric (glass tissue), a glass mat, or the like in accordance with a gypsum-based board material to be produced such that the glass fiber nonwoven fabric, the glass mat, or the like may be arranged to be embedded on the surface or close to the surface, or molding can be performed without using a surface material.

There may be a case in which, upon the supply amount of the gypsum slurry 67 from the mixer 11 fluctuating, the volume of the staying gypsum slurry 161 fluctuates. According to the investigations by the inventors of the present invention, there may be a case in which, after being molded into a desired thickness in the molding machine 66, the thickness of the molded body being conveyed minutely fluctuates in response to a change in the volume of the staying gypsum slurry 161. If the thickness of the molded body fluctuates, the thickness of an obtained gypsum-based board material may also fluctuate. Therefore, in order to produce gypsum-based board materials whose thicknesses are precisely controlled, it is preferable to keep the volume of the staying gypsum slurry 161 substantially constant.

Hence, it is preferable that a gypsum-based board material producing apparatus according to the present embodiment includes, in addition to a molding machine that molds a gypsum slurry prepared by the mixer 1, a sensor 17 that detects a change in a volume of the gypsum slurry staying in front of the molding machine, as illustrated in FIG. 1, for example. Then, it is preferable to include the control unit 15 that controls the supply amount of foam from the foaming apparatus 12 to the mixer 11 based on the change in the volume of the gypsum slurry staying in front of the molding machine 66, which is the detection result of the sensor 17.

As a method of controlling the volume of the staying gypsum slurry 161, for example, a method of controlling the supply amounts of the powder component P and the liquid component L to be supplied to the mixer 11, and a method of controlling the supply amount of foam to the mixer 11 are considered.

In the former case, a time that is in accordance with a staying time of raw materials in the mixer is required from starting to control the supply amounts of the raw material to be supplied to the mixer 11 to changing of the volume of the gypsum slurry to be supplied to the staying gypsum slurry 161 in front of the molding machine 66. In contrast, in the latter case, the foam is added in the vicinity of the slurry delivery part, which is the outlet of the mixer 11 as described above. Therefore, it is possible to reduce a time from starting of control to changing of the volume of the gypsum slurry to be supplied to the staying gypsum slurry in front of the molding machine.

Therefore, as described above, it is preferable that the control unit 15 controls, in response to a detection result at the sensor 17 that detects a change in the volume of the gypsum slurry staying in front of the molding machine, the amount of foam supplied from the from the foaming apparatus 12 to the mixer 11.

The supply amount of foam from the foaming apparatus 12 to the mixer 11 can be controlled, for example, by operating conditions of the pump 13 and operating conditions of the foaming apparatus 12.

As long as the control unit 15 is configured to control the operating conditions of the pump 13 and the like based on a detection result from the sensor 17 as described above, its specific configuration is not particularly limited. For example, as indicated by the dotted lines in FIG. 1, when producing a gypsum-based board material, the control unit 15 may be configured to control members constituting the gypsum-based board material producing apparatus 10 other than the foaming apparatus 12 and the pump 13 described above. That is, the control unit 15 may be configured to control the mixer 11, the above described molding unit 16, the sensor 17, and the like.

Also, for example, a control unit 15 may be provided with respect to each member included in the gypsum-based board material producing apparatus 10 such that communication and the like can be performed between the control units provided for the respective members.

A configuration of the sensor 17 is also not particularly limited. As a sensor, which can detect a change in the volume of the staying gypsum slurry 161 in front of the molding machine 66, for example, a sensor such as a noncontact type sensor that can detect a change in the distance between the sensor 17 and the surface of the staying gypsum slurry 161, or a contact type and/or noncontact type sensor that can measure the amount of the staying gypsum slurry, can be used The gypsum-based board material producing apparatus according to the present embodiment may include various members and units as needed other than the members described above.

For example, in addition to the molding unit 16, at the downstream side with respect to the molding unit 16, for example, a rough cutter that roughly cuts the molded body molded by the molding machine 66, a drying unit that dries surplus moisture in the molded body molded by the molding machine 66, a cutting unit that cuts the produced gypsum-based board material, a conveying unit that conveys the produced gypsum-based board material, and the like can be arranged.

Although FIG. 1 illustrates an example in which one mixer 11 is provided, it is not limited to such an embodiment, and a plurality of mixers 11 may be provided, for example.

In a case where a plurality of mixers 11 are provided and a gypsum slurry 63 without containing foam and a gypsum slurry 67 containing foam are produced as described with respect to the molding unit illustrated in FIG. 6, the gypsum slurry 63 and the gypsum slurry 67 may be prepared by different mixers.

In a case where the gypsum-based board material producing apparatus 10 includes a plurality of mixers 11, it is preferable that, to a mixer that adds foam to a gypsum slurry among the plurality of mixers 11, the foaming apparatus 12 and the pump 13 are connected as described above.

According to the gypsum-based board material producing apparatus according to the present embodiment described above, because the pump is provided between the foaming apparatus and the mixer, the amount of foam added to the gypsum slurry can be precisely controlled regardless of a change in internal pressure in the mixer.

Further, because the gypsum-based board material producing apparatus according to the present embodiment, as described above, can precisely control the amount of added foam to the gypsum slurry, for example, the gypsum-based board material producing apparatus according to the present embodiment can be preferably used to produce a gypsum-based board material having a specific gravity of 0.4 or more and 0.7 or less and containing a large number of foam-derived voids.

EXAMPLES

In the following, specific Examples will be described. However, the present invention is not limited these specific Examples.

Example 1

Using the gypsum-based board material producing apparatus 10 illustrated in FIG. 1, 100 gypsum boards having a board thickness of 12.5 mm, a width of 909 mm, and a length of 1820 mm defined in JIS A 6901 (2014) were produced, and the produced gypsum boards were evaluated with respect to variations in the thickness and weight.

Here, a procedure of generating the gypsum boards of the present Example will be described with reference to FIG. 1 to FIG. 4 and FIG. 6.

First, a procedure of producing a gypsum slurry to be supplied to the gypsum boards will be described.

In the present Example, the gypsum slurry was prepared by using the foaming apparatus 12, the pump 13, and the mixer 11 included in the gypsum-based board material producing apparatus 10 illustrated in FIG. 1. Then, the prepared gypsum slurry was molded by the molding unit 16 to produce the gypsum boards.

As illustrated in FIG. 1, the foaming apparatus 12 and the pump 13, and the pump 13 and the mixer 11 are respectively connected by the pipes 141 and 142, and the pump 13 is provided between the foaming apparatus 12 and the mixer 11 in the conveying path of the foam. The foam produced by the foaming apparatus 12 was conveyed to the mixer 11 by the pump 13. Note that the length L1 of the pipe 141 and the length L2 of the pipe 142 were configured such that L2<L1.

To the foaming apparatus 12, the foaming agent supply pipe 121A and the air supply pipe 121B, which are illustrated in FIG. 1, and a water supply pipe, which is not illustrated, are connected. In the foaming apparatus, a foaming agent receiving tank, a water tank, a dilution tank, and a foaming part are arranged, the foaming agent supply pipe 121A is connected to the foaming agent receiving tank, and the water supply pipe is connected to the water tank.

Then, the foaming agent supplied to the foaming agent receiving tank and water supplied to the water tank were each pumped out by the pump to be supplied to the dilution tank, and the foaming agent diluted solution was prepared in the dilution tank. Next, the foaming agent diluted solution was supplied to the foaming part from the inside of the dilution tank by the pump, and air was supplied from the air supply pipe 121B connected to the foaming part to form a mixture of the foaming agent diluted solution and air, and a shear force was applied to the mixture to generate foam.

Note that a foaming agent containing an alkyl ether sulfate as a main component was used.

As the pump 13, a uniaxial eccentric screw pump was used that is a type of a rotary pump among positive displacement pumps. During producing gypsum boards, the operating conditions of the foaming apparatus 12 and the pump 13 were controlled such that the pressure at the foam suction port 131 of the pump 13 was higher than the pressure at the foam discharge port 132 of the pump 13. Note that although a pressure difference between the pressure at the foam suction port 131 of the pump 13 and the pressure at the foam discharge port 132 of the pump 13 is not particularly limited, it was confirmed in advance that gypsum boards can be normally produced in a case where the pressure difference is greater than or equal to 0.01 MPa and less than or equal to 0.20 MPa. In the present Example, the operating conditions were controlled such that the pressure difference between the pressure at the foam suction port 131 of the pump 13 and the pressure at the foam discharge port 132 of the pump 13 was set to be 0.05 Mpa.

The mixer 11 has a configuration similar to that illustrated in FIG. 2 to FIG. 4, and includes a raw material supply part, a mixing area, and a slurry delivery part.

The raw material supply part includes a powder supply port (not illustrated) for supplying a powder component and a liquid supply port (not illustrated) for supplying a liquid component. The powder supply port and the liquid supply port are respectively connected to the powder supply pipe 111A and the liquid supply pipe 111B.

Then, the gypsum slurry was prepared by stirring and mixing, in the mixing area 21a, the powder component and the liquid component supplied from the raw material supply part. Because an configuration in the mixing area 21a has already been described, its description is omitted here.

Then, the prepared gypsum slurry was taken out from the fractionation ports 24a and 24b provided on the peripheral wall 213 of the housing 21 of the mixer 11 and the slurry delivery part 25 to be supplied to the molding unit 16.

Note that the slurry delivery part 25 includes the slurry delivery port 251 provided on the peripheral wall 213, the hollow connection part 252 connected to the slurry delivery port, and the vertical chute 253.

The foam supply port 143 is disposed (opened) on the hollow connection part 252 of the slurry delivery part 25, and the pipe 142 connected to the foam discharge port 132 of the pump 13 is connected to the foam supply port 143. At the hollow connection part 252, the foam from the pump 13 was added to the gypsum slurry.

Note that at the slurry delivery part 25, the foam was added such that the specific gravity of the gypsum core was 0.65.

As the powder component to be a raw material of the gypsum slurry, calcined gypsum, a setting modifier, a water reducing agent, and an adhesion improving agent were used and mixed such that, with respect to 100 parts by mass of the calcined gypsum, the setting modifier was at 1 parts by mass, the water reducing agent was at 0.3 parts by mass, and the adhesion improving agent was at 0.5 parts by mass.

As the liquid component to be a raw material of the gypsum slurry, water was used and supplied such that, with respect to 100 parts by mass of the calcined gypsum in the powder component, water was at 70 parts by weight.

As described above, the gypsum slurry was continuously prepared by the foaming apparatus 12, the pump 13, and the mixer 11, and the gypsum slurry was supplied to the molding unit 16. Note that the gypsum slurry to which the foam has been added is supplied from the slurry delivery part 25 and the gypsum slurry to which the foam has not been added is supplied from the fractionation ports 24a and 24b.

Next, with reference to FIG. 6, a procedure of molding, by the molding unit 16, a gypsum slurry to generate gypsum boards will be described.

The front face cover base paper (board base paper) 64 is continuously conveyed along the production line from the right side to the left side of FIG. 6. In the present example, 200 g/m² of board base paper was used as both the front face cover base paper 61 and the back face cover base paper 62 described later below.

The gypsum slurry obtained in mixer 11 was supplied onto the front face cover base paper 61 and the back face cover base paper 62 from the fractionation ports 24a and 24b through the fractionation pipes 241a and 242a at upstream sides of the conveying directions of the roll coaters 64.

The gypsum slurry 63, to which foam has not been added, on each of the front face cover base paper and the back face cover base paper 62 reached the spreading parts of the coaters 64 and was spread by the spreading parts. Both a thin layer of the gypsum slurry 63 and a marginal region are formed on the front face cover base paper 61. Similarly, a thin layer of the gypsum slurry 63 is formed on the back face cover base paper 62.

The front face cover base paper 61 is conveyed without changing the direction. The back face cover base paper 62 is turned by the turning roller 65 to be conveyed in the conveying line direction of the front face cover base paper 61.

Then, both the front face cover base paper 61 and the back face cover base paper 62 reach the molding machine 66. Here, the gypsum slurry 67, to which the foam has been added, is supplied via the slurry delivery part 25 between the thin layers formed on the respective board base papers that are the front face cover base paper 61 and the back face cover base paper 62.

By passing through the molding machine 66, a continuous stacked body is formed in which a layer formed of the gypsum slurry 63 and the gypsum slurry 67 is arranged between the front face cover base paper 61 and the back face cover base paper 62. The stacked body was molded such that the thickness of the gypsum board becomes 12.5 mm.

Note that the sensor 17 that detects a change in the volume of the staying gypsum slurry 161 that is a gypsum slurry staying in front of the molding machine 66 was provided. Then, based on the detection result of the sensor 17, the supply amount of foam that is supplied from the pump 13 to the mixer 11 was controlled by control unit 15 such that the volume of the staying gypsum slurry 161 is kept constant during producing gypsum boards. Specifically, when the volume of the staying gypsum slurry 161 decreased, the supply amount of foam from the pump 13 to the mixer 11 was increased, and when the volume of the staying gypsum slurry 161 increased, the supply amount of foam from the pump 13 to the mixer 11 was decreased.

Note that, as the sensor 17, a noncontact type sensor that can detect a change in the distance between the sensor 17 and the surface of the staying gypsum slurry 161 was used.

The obtained molded body was hardened in the process of conveyance. The molded body that has been hardened reaches a rough cutter (not illustrated). The rough cutter cuts the continuous stacked body into a board-shaped body having a predetermined length. Then, the board-shaped body including a core material consisting mainly of gypsum covered by base paper is formed. That is, a semi-finished product of the gypsum board is formed.

The roughly cut stacked body further passed through a dryer (not illustrated) and was forcibly dried so as to remove excess water (drying step). Subsequently, the stacked body was cut into a product with a predetermined length so as to produce the gypsum board.

With respect to the obtained 100 gypsum boards, their thicknesses, and the board weight per board were measured, and their variations were evaluated. The results are indicated in FIG. 7A and FIG. 7B.

Figure 7A:
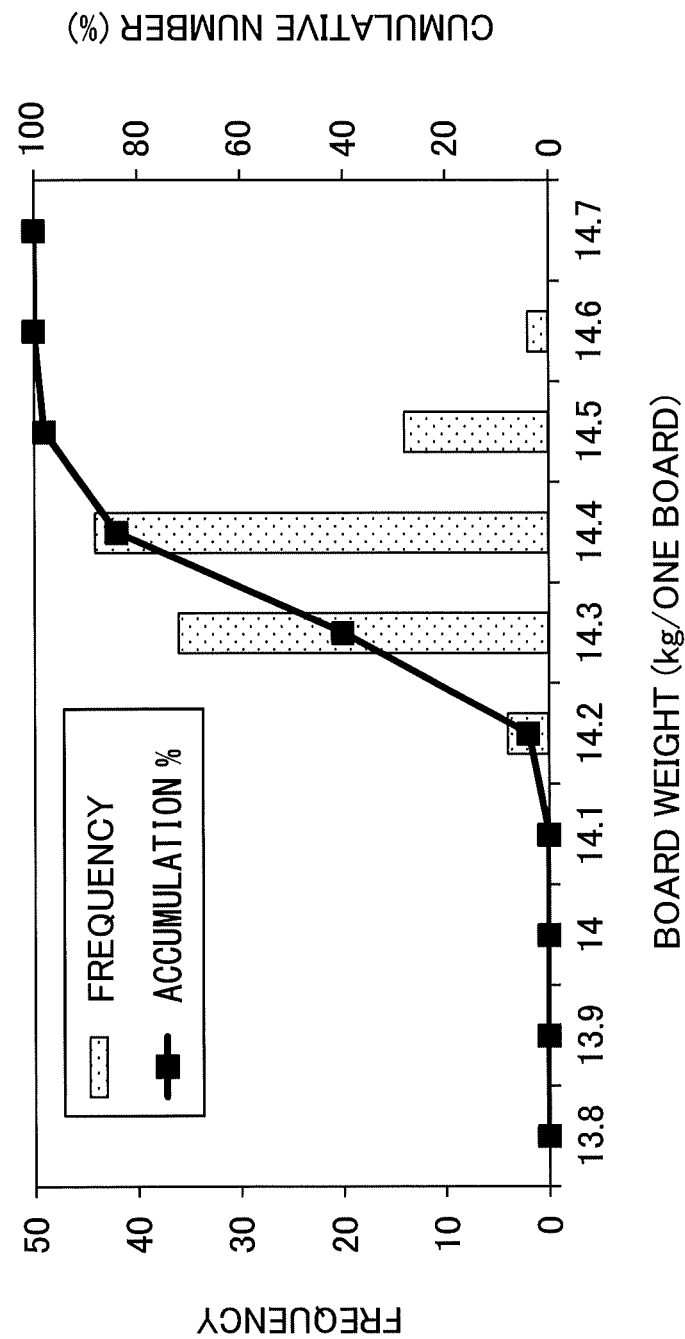
FIG. 7A illustrates a frequency distribution of board weights of gypsum boards according to Example 1.

FIG. 7A illustrates the frequency and the cumulative number (%) with respect to the board weights of the gypsum boards. FIG. 7B illustrates the frequency and the cumulative number (%) with respect to the thicknesses of the gypsum boards.

Comparative Example 1

Except that the pump 13 was not provided, 100 gypsum boards were produced in a manner similar to that of Example 1

Note that, in Comparative Example 1, because the pump 13 was not provided, the foaming apparatus 12 and the mixer 11 were directly connected by a pipe. The amount of foam supplied from the foaming apparatus 12 to the mixer 11 was controlled by a supply amount of raw materials such as a foaming agent and the like to be supplied to the foaming apparatus.

With respect to the obtained 100 gypsum boards, their thicknesses, and the board weight per board were measured, and their variations were evaluated. The results are indicated in FIG. 8A and FIG. 8B.

Figure 8B:
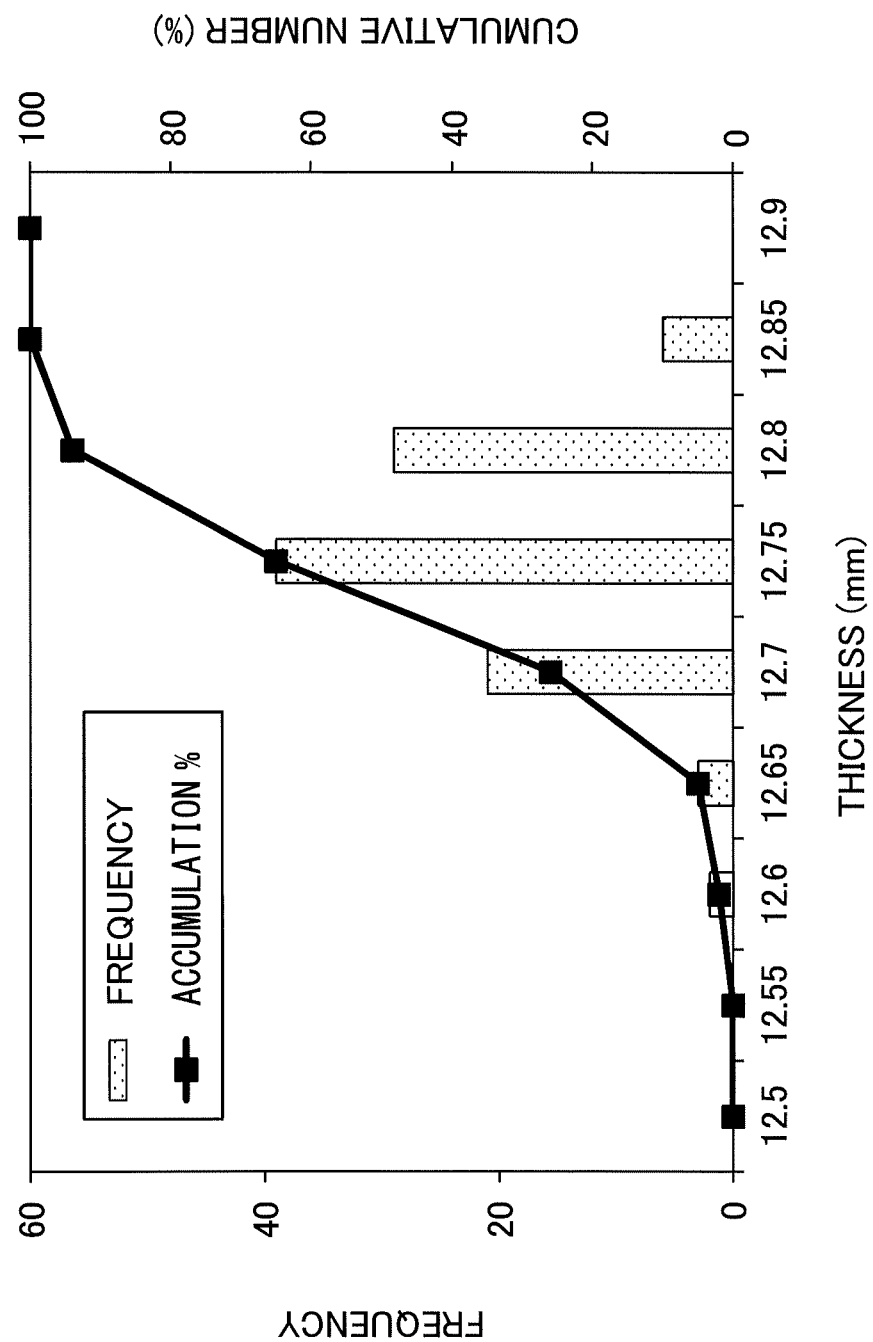
FIG. 8B illustrates a frequency distribution of thicknesses of the gypsum boards according to Comparative Example 1.

FIG. 8A illustrates the frequency and the cumulative number (%) with respect to the board weights of the gypsum boards. FIG. 8B illustrates the frequency and the cumulative number (%) with respect to the thicknesses of the gypsum boards.

According to the results indicated in FIG. 7A, FIG. 7B, FIG. 8A, and FIG. 8B, it could be confirmed that the variation in board weights, that is, the distribution width was smaller in Example 1 than that in Comparative Example 1. Further, a same tendency was confirmed with respect to the thicknesses of the boards. It is considered that this is because the specific gravities of the gypsum boards could be kept substantially constant in Example 1, because the pump 13 was arranged between the foaming apparatus 12 and the mixer 11, and the amount of foam added to the gypsum slurry could be precisely controlled.

The cross section of the gypsum board obtained in Example 1 was evaluated with a laser microscope, and it could be confirmed that voids derived from the foam added to the gypsum slurry had a substantially spherical shape and their sizes were substantially uniform. It is considered that this is because using, as a pump, a uniaxial eccentric screw pump, which is a type of a rotary pump among positive displacement pumps, makes it possible to suppress, when the pump conveys the foam, the foam from deforming without adding excessive force to the foam.

Although gypsum-based board material producing apparatuses have been described above with reference to the embodiments and the like, the present invention is not limited to the above-described embodiments and the like. Various variations and modifications may be made within the scope of the present invention recited in claims.

The present application is based on and claims the benefit of priority of Japanese Patent Application No. 2016-023897 filed on Feb. 10, 2016, the entire contents of Japanese Patent Application No. 2016-023897 are herein incorporated by reference.

DESCRIPTION OF THE REFERENCE NUMERAL 10 gypsum-based board material producing apparatus
11 mixer
12 foaming apparatus
13 pump
15 control unit
17 sensor
66 molding machine

The invention claimed is:

1. A gypsum-based board producing apparatus comprising:
    a mixer configured to prepare a gypsum slurry;
    a foamer; and
    a pump configured to convey foam generated by the foamer to the mixer;
    a first pipe having a first length that connects the pump and the mixer; and
    a second pipe having a second length that connects the foamer and the pump,
    wherein the pump is a positive displacement pump, and
    wherein the first length is shorter than the second length.

2. The gypsum-based board producing apparatus according to claim 1,
    wherein the mixer includes a raw material supply part, a mixing area, and a slurry delivery part, and
    wherein a foam supply port for supplying, to the gypsum slurry, the foam conveyed by the pump is disposed on the slurry delivery part.

3. The gypsum-based board producing apparatus according to claim 1, wherein the pump is a rotary pump.

4. The gypsum-based board producing apparatus according to claim 3, wherein
    the pump is a screw pump.

5. The gypsum-based board producing apparatus according to claim 4, wherein
    the screw pump is a uniaxial screw pump.

6. The gypsum-based board producing apparatus according to claim 1, further comprising:
    a molder configured to mold the gypsum slurry prepared by the mixer;
    a sensor configured to detect a change in a volume of gypsum slurry staying in front of the molder; and
    a controller configured to control a supply amount of foam from the foamer to the mixer based on a detection result of the sensor.

* * * * *